United States Patent Office 3,676,164
Patented July 11, 1972

3,676,164
TREATMENT OF WASTE SULFITE LIQUOR TO AVOID POLLUTION, AND METHOD OF MAKING
Harry Silby, Miami, Fla., assignor to Wire Sales Company, Chicago, Ill.
No Drawing. Filed Apr. 20, 1970, Ser. No. 30,331
Int. Cl. C04b 29/02
U.S. Cl. 106—77          3 Claims

ABSTRACT OF THE DISCLOSURE

Hard briquettes suitable for use in the building arts can be formed from the waste products obtained from the treatment of waste sulfite liquor. Using lime as the treating agent, calcium sulfate is obtained as a by-product from the treatment of waste sulfite liquor from paper pulp operations. Iron oxide, mineral fillers and a suitable binder are used to make the briquettes.

---

Waste discharged by the paper pulp industry as well as other industries runs into the hundreds of millions of gallons every day. Because of increasing concern at all levels, industry has turned to various processes for the treatment and purification and/or conversion of the waste material into harmless products or products which are harmless and can be commercially useful. Whereas there are many methods available which would convert obnoxious waste materials into unobjectionable products, yet because of the cost of such waste treating processes the conversion of the waste into a useless product is undesirable and even further multiplies the cost of the waste conversion process. It would therefore be desirable to develop a treating process which eliminates the obnoxious waste material and also produces a useful product.

Waste sulfite liquor discharged by the paper pulp industry contains a large amount of materials which are pollutants and which are now prohibited from being dumped into streams, lakes and rivers.

The method of this invention resides in treating waste sulfite liquor with lime, calcium oxide, to produce a low density calcium sulfate product which can be used for the formation of building material and thereby eliminates the need for dumping spent sulfite liquor into effluent streams. Advantages of the present invention include the elimination of the use of water for dilution; no heating is necessary; no cooling is necessary, filtration is avoided and a considerable saving of time is achieved.

Briefly summarized, the first step in the basic procedure of the invention is to add calcium oxide in the form of lime to the spent sulfite liquor solution obtained in paper pulp manufacturing processes. Sufficient agitation is employed to assure adequate mixing. As a result of this operation, a paste is obtained which is then subjected to elevated temperature for drying. After drying, calcium sulfate product is obtained. The product has a low level of odor and in most instances is odor free. An important characteristic of this product is its relative low density.

Described in further detail, in carrying out the initial steps of the invention, any sulfite waste liquor produced in paper pulp manufacturing can be used. Generally, the waste sulfite liquor is a dark brown, almost black, odorous liquid and its exact composition will vary from company to company. The compositions of such waste materials are widely known or can be determined by known analytical procedures and need not be further identified. Any waste sulfite liquor can be used for practicing the present invention. The spent sulfite liquor is mixed with the calcium oxide (lime) in an amount sufficient to form a paste or paste-like substance. This paste product is dried at a temperature of at least 100° C. to obtain a finely divided powder which is calcium sulfate of a low density form. Generally, about equal amounts of liquor and lime are used although this is not critical and the quantities can be varied as will be apparent to those skilled in the art in order to obtain a paste-like material.

The following examples illustrate the present invention:

EXAMPLE I

Starting with 100 ml. of spent sulfite liquor, 90 grams of calcium oxide (CaO) is slowly mixed with the liquor. Stirring is carried out until a uniform paste is obtained which required about five minutes. After drying at about 125° C., a finely divided calcium sulfate product is obtained which can then be utilized to form building products. When this example was repeated using 70 grams of calcium oxide, the mixture could be spray dried. No obnoxious odors were observed.

EXAMPLE II

The procedure of Example I was followed again but this time equal parts by weight of sulfite liquor and calcium oxide were used. The paste that was obtained thereby was dried in an oven at 125° C. for about 35–40 minutes. The final product was a finely powdered calcium sulfate.

To form the building product such as a briquette the low density calcium sulfate obtained from the waste sulfate is mixed with iron oxide in finely divided form together with a suitable amount of an inert mineral filler such as asbestos powder glass fibers, or chips or the like and a binder material such as waterglass (sodium silicate). The binder should be stable at temperatures of up to at least 100° C.; that is, while volatile components such as the solvent for the binder will vaporize, the binder itself should be capable of withstanding the firing temperatures.

The components are mixed to form a substantially uniform mass or paste. The latter can then be poured or otherwise shaped into suitable forms such as bricks and then be fired or heated in an oven at an elevated temperature; at least 100° C. for at least 15 minutes.

The bricks formed as a result of applicant's process have been tested and have been found to be waterproof and fireproof and are substantially lighter than cement brick. In addition they have insulating properties, can be cut, filed, bored and do not chip. Similarly, pigments can be incorporated into the paste to produce a variety of colored bricks. They are especially suitable as fire bricks.

Generally, equal amounts of calcium sulfate, iron oxide and mineral filler (asbestos) are used, but the relative amounts can vary. For example, based on the dry solids, the ingredients may be present in the following amounts: 5 to 50% calcium sulfate, 5 to 50% iron oxide, 5 to 20% mineral filler and the remainder consists of the binder. At least 30% binder should be present and the combined amount of calcium sulfate and iron oxide is at least about 15%.

The iron oxide used in accordance with this invention is preferably $Fe_2O_3$ and is obtained from the treatment of waste pickle liquors. Enormous amounts of iron oxide are obtained from the metal industry as a result of converting spent acids. Since spent acid cannot be discharged into bodies of water and must be treated, the industry is faced with the mounting problem of what to do with byproducts.

The present invention therefore enables the large amounts of by-product calcium sulfate produced by treatment of waste sulfite liquor and the large amounts of by-product iron oxide produced by treatment of waste pickle liquor to be combined together to form a useful product.

The following example illustrates the preparation of a brick material all parts being in weight percent.

EXAMPLE III

| Ingredients | Amounts (parts) | Percent by weight solids |
|---|---|---|
| Calcium sulfate (finely divided) | 20 | 12.5 |
| Iron oxide | 20 | 12.5 |
| Asbestos powder | 20 | 12.5 |
| Sodium silicate (40% water glass solids) | 250 | 62.5 |

The powders are thoroughly mixed by constant stirring and are incorporated into the sodium silicate solution until a uniform paste is obtained. The paste is poured into the forms and dried at 125° C. for 35–40 minutes.

The density of the brick was determined by established testing techniques and was 1.664. Products produced in accordance with this invention ranged in density from 1.4 to about 1.8. The product had a hardness of 5 mohs.

In addition, to the formation of bricks it is possible to form the paste material into other articles such as shingles, siding material, panels and the like.

I claim:

1. A method of making a hard briquette for use in the building arts from waste materials comprising treating waste sulfite liquor obtained from paper pulp manufacturing operations with a sufficient amount of lime to precipitate the solid contents, drying the solid precipitate to obtain a low density, finely-divided product, mixing the finely-divided product with finely-divided iron oxide obtained as the product from the treatment of waste metal pickling liquor, an inert mineral filler and a binder material sufficient to hold the components together to form a substantially uniform mass and which binder is stable at temperatures up to 100° C., shaping the mass into a briquette and firing said briquette at an elevated temperature of at least 100° C. for at least 15 minutes to volatilize the volatile portion of the binder and to form a mass into a self-supporting briquette.

2. The method as defined in claim 1 wherein the filler material is selected from the group consisting of asbestos powder and finely-divided glass and the binder material is sodium silicate.

3. The method as defined in claim 1 wherein the amount of filler is from 5 to 20 percent of the dry solids.

References Cited

UNITED STATES PATENTS

| | | | |
|---|---|---|---|
| 2,165,344 | 7/1939 | Colton | 106—109 |
| 2,316,039 | 4/1943 | Wilson | 106—109 |
| 1,666,180 | 4/1928 | Roos et al. | 106—77 |
| 2,833,659 | 5/1958 | Bauer | 106—123 |
| 3,392,163 | 7/1968 | Barnwell et al. | 106—72 |

JAMES E. POER, Primary Examiner

U.S. Cl. X.R.

106—84, 109, 111